United States Patent [19]

Tong

[11] 3,728,678

[45] Apr. 17, 1973

[54] ERROR-CORRECTING SYSTEMS UTILIZING RATE ½ DIFFUSE CODES

[75] Inventor: Shih Yung Tong, Middletown, N.J.

[73] Assignee: Bell Telephone Laboratories, Incorporated, Murray Hill, N.J.

[22] Filed: Sept. 3, 1971

[21] Appl. No.: 177,686

[52] U.S. Cl. ....................................... 340/146.1 AQ

[51] Int. Cl. ........................ G06f 11/12, G08c 25/00

[58] Field of Search ............................ 340/146.1 AQ

[56] References Cited

UNITED STATES PATENTS

| | | | |
|---|---|---|---|
| 3,469,236 | 9/1969 | Gallager | 340/146.1 AQ |
| 3,605,090 | 9/1971 | Burton | 340/146.1 AQ |
| 3,227,999 | 1/1966 | Hagelbarger | 340/146.1 AQ |
| 3,402,393 | 9/1968 | Massey | 340/146.1 AQ |
| 3,447,132 | 5/1969 | Kohlenberg | 340/146.1 AQ |
| 3,571,795 | 3/1971 | Tong | 340/146.1 AQ |
| 3,593,282 | 7/1971 | Tong | 340/146.1 AQ |

*Primary Examiner*—Charles E. Atkinson
*Attorney*—R. J. Guenther et al.

[57] ABSTRACT

Sequences of information bits, encoded in an orthogonalizable convolutional code of rate 1/2 and transmitted via a communication channel, are decoded to correct $t$ random errors and bursts of B blocks where each block is 2 bits in length. The interconnections between an information bit shift register in the encoder and decoder and their respective parity check bit generating circuits and between a syndrome register and a majority logic circuit in the decoder are specified by relatively simple formulas which are functions of $t$ and B.

12 Claims, 8 Drawing Figures

PARITY TRIANGLE OF A DIFFUSE CODE, t=2, B=3

$g(X) = \Sigma g_i X^i = 1 + X^3 + X^8 + X^{12}$

ENCODER g(X) = 0,2,3,20,52,57,78,88

*FIG. 7A*

SAMPLES OF RATE 1/2 ORTHOGONALIZABLE DIFFUSE CODES

| $t$ (BITS) | $n_e$ (BITS) | $N_A$ (BLOCKS) | $B_{(MIN)}$ (BLOCKS) | NONZERO TERMS OF GENERATOR POLYNOMIAL | ORTHOGONALIZATION RULES* |
|---|---|---|---|---|---|
| 2 | 12 | $4_3$ | 2 | $(0, 0_1, 2_2, 3_3)^{\dagger}$ | $(3_3 + 1_2)$ |
| 3 | 26 | $13_3$ | 5 | $(0, 1, 1_1, 7_2, 9_3, 12_3)$ | $(9_3 + 3_2, 12_3 + 4_1)$ |
| 4 | 49 | $38_3$ | 17 | $(0, 2, 3, 3_1, 18_2, 23_2, 27_3, 37_3)$ | $(23_2 + 8_1, 27_3 + 12_2 + 7_2, 37_3 + 13_1)$ |
| 5 | 80 | $89_3$ | 44 | $(0, 3, 4, 5, 5_1, 40_2, 54_2, 60_3, 67_3, 88_3)$ | $(5 + 1, 54_2 + 19_1, 60_3 + 11_2 + 25_2, 67_2 + 12_1, 88_3 + 33_1 + 26_1)$ |
| 6 | 124 | $218_3$ | 120 | $(0, 2, 3, 7, 8, 8_1, 88_2, 118_2, 138_2, 147_3, 157_3, 217_3)$ | $(8 + 4 + 5 + 6, 118_2 + 38_1, 138_2 + 58_1 + 28_1, 147_3 + 17_2 + 67_2 + 37_2, 157_3 + 18_1, 217_3 + 68_1 + 78_1)$ |
| 7 | 178 | $375_3$ | 223 | $(0, 6, 7, 9, 10, 11, 11_1, 141_2, 154_2, 245_2, 257_3, 296_3, 322_3, 374_3)$ | $(10 + 3 + 1, 11 + 8 + 4, 154_2 + 24_1, 245_2 + 115_1 + 102_1, 257_3 + 23_2 + 127_2 + 114_1, 296_3 + 50_1, 322_3 + 76_1 + 37_1, 374_3 + 128_1 + 89_1 + 63_1)$ |

FIG. 7B

| t (BITS) | $n_e$ (BITS) | $N_A$ (BLOCKS) | $B_{(MIN)}$ (BLOCKS) | NONZERO TERMS OF GENERATOR POLYNOMIAL | ORTHOGONALIZATION RULES* |
|---|---|---|---|---|---|
| 8 | 249 | $695_3$ | 427 | $(0, 8, 9, 11, 13, 14, 15, 15_1, 253_2, 389_2, 406_2, 457_2, 473_3, 575_3, 660_3, 694_3)$ | $(19+6+3+2, 20+14+4, 21+15+8+5+1, 389_2+151_1, 406_2+168_1+32_1, 457_2+219_1+83_1+66_1, 473_3+31_2+235_2+99_2+82_2, 575_3+117_1, 660_3+202_1+100_1, 694_3+236_1+134_1+49_1)$ |
| 9 | 332 | $1217_3$ | 761 | $(0, 11, 13, 16, 17, 19, 20, 21, 21_1, 435_2, 458_2, 596_2, 803_2, 825_3, 894_3, 940_3, 1121_3, 1216_3)$ | $(19+6+3+2, 20+14+4, 21+15+8+5+1, 458_2+44_1, 596_2+182_1+159_1, 803_2+389_1+366_1+228_1, 825_3+43_2+411_2+388_2+250_2, 894_3+90_1, 940_3+136_1+67_1, 1121_3+317_1+251_1+205_1, 1216_3+412_1+343_1+297_1+113_1)$ |

* ONLY THOSE EQUATIONS WHICH REQUIRE ORTHOGONALIZATION ARE LISTED.
† READ $Y_X$ AS $XB+Y$, IF $Y \neq 0$.

ERROR-CORRECTING SYSTEMS UTILIZING RATE ½ DIFFUSE CODES

BACKGROUND OF THE INVENTION

1. Field of the Invention

This invention relates to a new class of codes and, more particularly, to error correcting systems utilizing those codes for automatically correcting random and burst errors in data transmission systems.

2. Description of the Prior Art

With the almost phenomenal increase in the use of computers and other data processing equipment, there has arisen a concomitant need for more accurate means of transmitting and processing that digital data. For example, a large variety of inexpensive "plug-in" terminal units are available by means of which a user can gain access to a centrally located computer on a time-sharing basis. Typically, the user communicates with a computer via his terminal equipment, his telephone and the related telephone transmission line, each of which is a potential source of errors. Accuracy, in this instance, must nonetheless be ensured to guarantee privacy among time-sharing users. That is, access to confidential information is often keyed to the submission of a code number or word. Obviously, errors in one submitted code word or number may permit access by one user to information belonging to another user. It is also apparent that increased system accuracy reduces the occurrence of costly time-consuming errors.

A great many error detection and correction techniques are available which provide the required level of accuracy. These techniques are usually classified according to the type or types of errors which they correct, that is, random errors only, burst errors only or combined random and burst errors. It is this last combination-type error correcting capability which is provided by the apparatus of the present invention.

In general, there are two approaches for correcting errors in systems susceptible to both random and burst errors. The first such approach involves the use of different decoding strategies for burst and random errors. The success of such an approach depends on the existence of a sharp distinction between the burst and random errors such as exists, for example, in the troposcatter channel. Typical examples of this first approach are described in A. H. Frey, Jr., "Adaptive Decoding Without Feedback," *IBM Technical Report*, TR 48.67.001, Nov. 8, 1967; M. J. B. Golay, "Notes on Digital Coding," *Proceedings of the IRE* (correspondence), Volume 37, page 657, 1949; A. Kohlenberg and G. D. Forney, Jr., "Convolutional Coding for Channels with Memory," *IEEE Transactions Information Theory*, Volume IT, September, 1968, pages 618 to 626. The last reference which particularly specifies convolutional orthogonalizable codes is J. L. Massey's *Threshold Decoding*, MIT Press, 1963.

A second approach for correcting random and burst errors involves the specification of a single decoding algorithm for both types of error. Such an approach depends on the choice of a suitable code that corrects both random and burst errors efficiently. Although in accordance with this second approach there is no need to distinguish burst from random errors, such a code generally requires more guard space between errors for burst error correction and is, in addition, a less powerful random error correcting code. One can, of course, use the technique of interleaving a random error correcting code to effect correction of both types of errors. In general, however, such an interleaved code requires an even larger guard space for burst error correction than that required with the use of a special code designed for the compound channel, that is, one susceptible to both random and burst errors. Examples of such special codes are the Reed-Solomon codes described in an article by J. S. Reed and G. Solomon entitled "Polynomial Codes over Certain Finite Fields," SIAM J. Volume 8, pages 300 to 306, 1960.

The class of codes of the preferred embodiment of the present invention follows this second decoding strategy; that is, only one decoding algorithm is specified for correction of both types of errors. Further, the codes do have large guard space requirements. Consequently, fewer shift register stages are required in the preferred embodiment of the present invention.

Accordingly, it is an object of the present invention to provide efficient and economical apparatus for correcting both random and burst errors in a data transmission system.

It is another object of the present invention to provide a random and burst error-correcting system having a small receiving terminal storage requirement.

Still another object of the present invention is to provide optimum random and burst error correcting systems easily determinable from simple specifications. More particularly, it is an object of the present invention to provide an optimized error correction system involving modification to the error correction circuitry which modifications are specified by the parameters of a simple relatively straightforward equation.

SUMMARY OF THE INVENTION

These and other objects of the present invention are realized in a specific illustrative embodiment which includes both a transmitting and receiving terminal connected by means of a noisy communication channel. Information sequences are encoded at the transmitting terminal with an orthogonalizable convolutional code of rate 1/2 which is capable of correcting $t$ random errors and burst errors of B blocks in length, where a block is 2 bits in length. As in the typical prior art system, a number of which are mentioned above, the encoder and decoder of the transmitting and receiving terminals, respectively, each include a multi-stage shift register for storing information signals and a parity check digit generating circuit connected to selected stages of the multi-stage shift register. Unlike the above-mentioned prior art systems, however, the stages to which the parity digit generating circuit are connected are determined directly from the coefficients of a unique well-defined, easily ascertainable generator polynomial. In addition, a second generalized equation is defined which yields an orthogonalization rule for a particular code which rule directly specifies connections in the decoder required to orthogonalize the code. Specifically, the orthogonalization rule for a code directs the modulo-2 addition of the contents of specified stages of the syndrome register which addition or additions effects orthogonalization. Orthogonalization, in turn, allows decoding by means of majority voting circuitry which is cheaper and simpler to use than alternate methods.

It is, therefore, a feature of the present invention that a class of codes is defined which are efficient and economical to use.

It is a further feature of this invention that encoding and decoding apparatus is provided which is readily programmable to correct almost any combination of random and burst errors.

It is a still further feature of the present invention that a noniterative method is utilized for specifying encoding and decoding circuitry to correct almost any combination of random and burst errors in a communication system.

BRIEF DESCRIPTION OF THE DRAWINGS

A complete understanding of the present invention and of the above and other objects and features thereof can be gained from a consideration of the detailed description of specific illustrative embodiments presented hereinbelow in connection with the accompanying drawings, in which:

FIGS. 7A and 7B show sample codes in accordance with the present invention.

DETAILED DESCRIPTION

Figure 1:
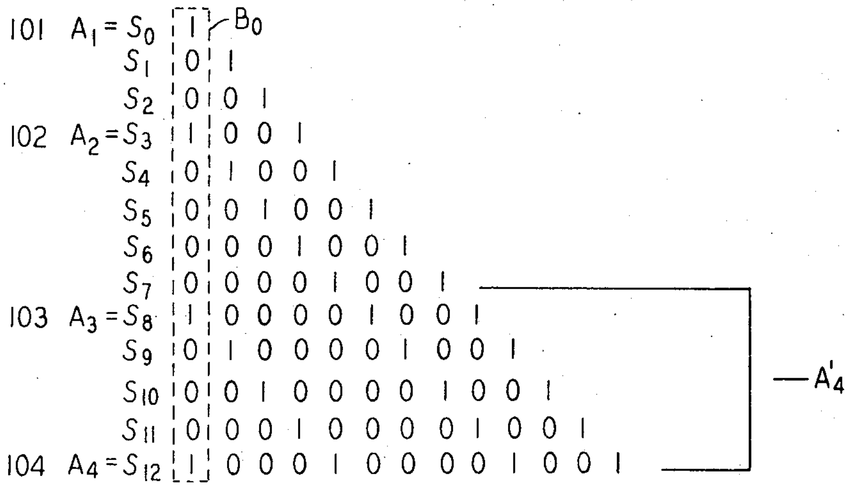
FIG. 1 shows a parity triangle for a diffuse code for correcting $t=2$, $B=3$ errors.

In order to facilitate the explanation of the apparatus and operation of the preferred embodiments of the present invention, it is considered helpful to first review a few brief fundamentals of the data processing arts. Clearly, however, an exhaustive tutorial presentation is not feasible. Further it is not considered desirable to duplicate material already well documented in a number of books and publications in the art. The reason for the inclusion of these fundamentals is simply to indicate the notation used herein and perhaps, incidentally, to refresh the memory of artisans who may have forgotten them for one reason or another. In addition to the references specifically cited in the discussion below, the following publications offer considerable background material: "Coding for Error Control," by D. T. Tang and R. T. Chien, *IBM Systems Journal*, Vol. 8, No. 1, 1969, p. 48 et seq, "A Class of Binary Recurrent Codes With Limited Error Propagation" by J. P. Robinson and A. J. Bernstein, *IEEE Transactions on Information Theory*, Vol. IT–13 No. 1, January 1967 and "Principles of Data Communication" by R. W. Lucky, J. Salz and E. J. Weldon, Jr., McGraw-Hill, 1968. It is also noted that the above-cited IBM Systems Journal includes an extensive bibliography of related publications.

Error detecting and correcting codes of the type to which the present invention is applicable are each uniquely characterized by a generator polynomial. Generator polynomials are a well-known tool in the data processing arts for describing such codes. For a complete discussion of generator polynomials, see, for example, *Error-Correcting Codes* by W. W. Peterson, John Wiley and Sons and The M.I.T. Press, 1961 or J. L. Massey, *Threshold Decoding*, M.I.T. Press and John Wiley and Sons, Cambridge, Mass., 1963.

Because of the complex nature of the theory of generator polynomials, it suffices to say here that the generator polynomials of the codes considered characterize those codes completely. Further, for binary systems the generator polynomials can be specified uniquely by their nonzero terms. Since a polynomial, in this case, has binary coefficients only of the dummy variable $x$, the specification of its nonzero terms is unique. For example $g(x) = 3,1,0$ simply means $g(x) = x^3+x^1+x^0$ which, in turn, is typically written as $g(x) = x^3+x+1$.

In accordance with accepted practice, then, the codes utilized in the present invention are described in terms of their generator polynomials which, in turn, are derived from so-called difference sets. Briefly, a difference set is a set of ordered integers $(N_1,N_2 \ldots N_k)$ such that all the partial sums, $$S_{ij}=\sum_{\sigma=i}^{j} N_\sigma i\leq j,$$

are distinct. For example, (1,3,2) forms a difference set since all partial sums of (1,3,2) are distinct. The partial sums are:

| | | | | | | |
|---|---|---|---|---|---|---|
| 1 | 3 | 2 | | 1 | 3 | 2 |
| 1+3 | 3+2 | | = | 4 | 5 | |
| 1+3+2 | | | | 6. | | |

The concept of difference sets can be generalized to more than one group of ordered integers. Such a difference set is called a composite difference set and has the property that the partial sums of each components difference set are all distinct. For example, (1,2,5) (4,6) forms a composite difference set since the individual partial sums are distinct as shown below.

| | | | | |
|---|---|---|---|---|
| 1 | 2 | 5 | 4 | 6 |
| 3 | 7 | | 10 | |
| 8 | | | | |

Another tool useful in facilitating an understanding of the present invention is the so-called parity triangle. The parity triangle, as is well-known in the art, is a matrix derived from the coefficients of the generator polynomial.

FIG. 1 illustrates the parity triangle for the generator polynomial $g(x) = 1+x^3+x^8+x^{12}$. It is noted that each row from the bottom upward is the preceding row simply shifted one place to the left. In addition, the columns to the left of the leftmost bit position of the bottom row have been deleted. Also, parity bits, represented by columns of 1's each adjacent a column of the depicted triangle of FIG. 1 have not been shown as is customary. Further, each row (101 through 104) having a 1 in the leftmost column is denoted by a subscripted A for reasons to be made clear below.

As suggested above, orthogonal codes are particularly useful because they may be accurately decoded by means of majority voting schemes. Since majority voting error correction is economical, it is desirable to "orthogonalize"d the codes of the present invention such that they can be decoded by means of majority voting techniques. In particular, self-orthogonal codes have no rectangles in the parity triangle (that is, no 1's — in two separate rows of the parity triangle characterizing the code — which define the corners of a rectangle). (See J. R. Macy, "Theory of Serial Codes" Master's Degree Dissertation, Stevens Institute of Technology, Hoboken, N.J. 1963.) Specifically, then, the object of the present invention is to produce a coding arrangement characterized by a parity triangle orthogonalized to remove any undesirable or "interfering" bits which prevent the use of threshold decoding techniques. Incidentally, these undesirable bits, of which there may be many, may be of the usual rectangle-forming variety or they may simply be bits which interfere with the optimization of the coding arrangement. In accordance with the present invention, however, it is not necessary to determine to which variety the undesirable bit or bits belong. The code and the resulting error correction arrangement automatically provide an orthogonalized, optimum system, in any case.

Briefly, then, the apparatus of one embodiment of the present invention includes an encoder in a transmitter comprising a multi-stage shift register and an exclusive-OR circuit. Selected stages of the multi-stage shift register are connected to the exclusive-OR circuit such that certain combinations of information bits are added (modulo-2) to produce required check bits. In particular, the number of encoder shift register stages corresponds to the number of terms in the generator polynomial and the selected stages of the shift register correspond to the nonzero terms of that generator polynomial. A decoder in the receiver includes a multi-stage shift register and exclusive-OR circuit, like that of the encoder, for producing set of check bits from the transmitter via an information sequence received from the channel. The decoder further includes a syndrome circuit in combination with a majority logic circuit for correcting incorrectly received information signals in response to information derived from the received and locally generated check bits.

In accordance with the present invention, the connections between the multi-stage shift register and the exclusive-OR circuit in the encoder and the connections within the check generating portion of the decoder are determined from a uniquely specified relationship. Similarly, the specification of the syndrome circuit is also determined from a set of straightforward relationships.

As noted above, the encoder and a portion of the decoder of the present invention are specified by the generator polynomial of the code to be utilized. Consequently, it is considered appropriate at this point to specify the generator polynomial defining the apparatus of one embodiment of the present invention. Thus, in accordance with one embodiment of the present invention, the code and, hence, the generator polynomial, is derived as follows, 1. Assign values to $t$ and B as desired where $t$ and B are the random and burst error correcting capability of the code, respectively;

2. Construct a difference set $(a_1, a_2, a_3 \ldots a_{-2})$ which may be done following the minimizing procedure proposed by J. Singer in an article entitled, "A Theorem in Finite Projective Geometry and Some Applications to Number Theory" appearing in the *Transactions of the American Mathematical Society*, Vol. 43, 1938, pp. 377–385;

3. Construct a composite difference set comprising the difference sets $(f_1, f_2, f_3 \ldots f_r)$ and $(k_1, k_2, k_3 \ldots k_s)$ under the constraints that, $r+s=t-2$ and $$\sum_{l=1}^{s} k_i > \sum_{j=1}^{r} f_i ;$$

4. Using the parameters derived in steps 1 through 3 above, construct the generator polynomial:

$$g(x)=0, a_1, a_1+a_2, \ldots, \sum_{i=1}^{t-2} a_i,$$

$$B+V, 2B+\alpha+V, 2B+\alpha+V+D_{11}, \ldots,$$

$$2B+\alpha+V+D_{r1}, 3B+\alpha+D_{r1}+2V_{11},$$

$$3B+\alpha+D_{r1}+2V_{11}+E_{11}, \ldots,$$

$$3B+\alpha+D_{r1}+2V_{11}+E_{s1}$$

where $$V=\sum_{i=1}^{t-2} a_1$$

$$D_{ij}=(V+2) \sum_{\sigma=j}^{i} f\sigma j \leq i$$

$$E_{ij}=(V+2) \sum_{\sigma=j}^{i} k\sigma j \leq i$$

$$\alpha=(V+2)\ (1+\sum_{\sigma=1}^{s} k\sigma).$$

With $g(x)$ thus specified, the encoder (and check generating portion of the decoder) is automatically specified. An example will best illustrate this. For instance, assume that an encoder in accordance with the preferred embodiment of the present invention is to be constructed for correcting $t=4, B=3$ errors. There are then only two members of the difference set $a_1, a_2 \ldots a_{t-2}$ to be assigned since $t-2=2$. Further, the members of that set should be chosen to be as small as possible (to minimize the so-called actual constraint length of the code). Thus, $a_1$ is chosen to be 2 and $a_2$ is chosen to be 1 in that order simply for convenience. Next, $r+s=t-2=2$. Again, for convenience, $r$ and $s$ are each chosen to be 1. The composite difference set thus consists of two members. Specifically, $f_1=1$ and $k_1=2$ are again chosen to minimize code length and in compliance with the requirement that $$\sum_{i=1}^{s} k_i > \sum_{j=1}^{r} f_i$$

Once these parameters have been determined, the remaining parameters are easily calculated. Thus, $$V = a_1 + a_2 = 1 + 2 = 3$$

$$D_{ij} = D_{11} = (V+2) \sum_{\sigma=1}^{1} f\sigma = (3+2)\ (1) = 5$$

$$E_{ij} = E_{11}(V+2) \sum_{\sigma=1}^{1} k\sigma = (3+2)\ (2) = 10$$

$$\alpha = (V+2)\ (1 + \sum_{\sigma=1}^{1} k\sigma) = (3+2)\ (1+2) = 15.$$

Consequently, from the general equation for the generator polynomial given above, it is seen that for the code chosen, $g(x)$ = 0,2,3, $B$+3, 2$B$+18, 2$B$+23, 3$B$+27, 3$B$+37. For purposes of illustration, B will be assigned the value 17. The generator polynomial then becomes.

$$g(x) = 0, 2, 3, 20, 52, 57, 78, 88.$$

Figure 2:
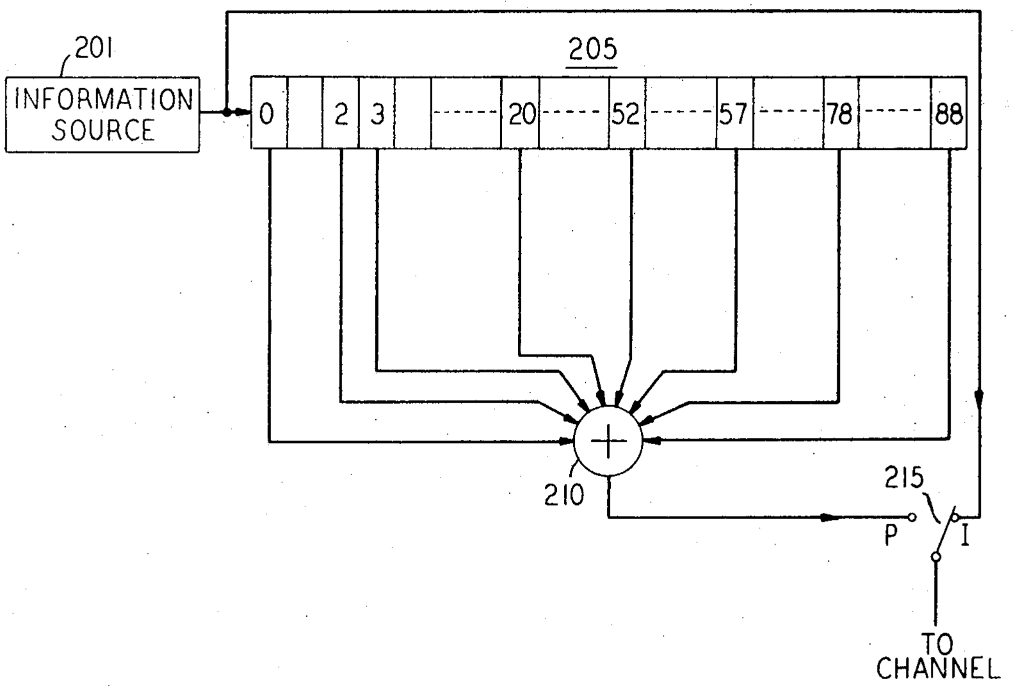
FIG. 2 illustrates the encoder for an illustrative preferred embodiment of the present invention.

The encoder for the code $t$=4, $B$=17 in accordance with the preferred embodiment of the present invention is shown in FIG. 2. As discussed above, there are 88 stages to the encoder shift register corresponding to the number of terms in the generator polynomial (recalling that only the nonzero terms have been explicitly set forth). Further, those stages which are connected to the exclusive-OR circuit are specified by the nonzero terms in the generator polynomial as shown in FIG. 2.

Referring to FIG. 2, it is noted that signals generated by information source 201 are applied to encoder shift register 205. As noted, also, various connections are completed between selected stages of shift register 205 and exclusive-OR circuit 210. These selected stages, as explained, correspond to the nonzero terms of the generator polynomial just as the total number of stages of shift register 205 corresponds to the total number of terms of the generator polynomial. Switch 215, controlled by timing control circuitry (not shown), intersperses information signals generated by information source 201 with parity signals generated by shift register 205 and exclusive-OR circuit 210 prior to application to the channel.

The decoder for one embodiment of the present invention, as stated, includes circuitry which essentially duplicates that of the encoder. In addition, the decoder includes an exclusive-OR circuit for adding (modulo-2) the received check bits to the check bits generated in the decoder from the received information signals to derive syndrome signals. The decoder further includes a multistage shift register for storing a number of such syndrome signals to be used in locating and correcting erroneously received information bits. This is accomplished by directly applying signals from certain stages of the syndrome register to a feedback connected majority logic circuit. (Majority logic circuits usable in the apparatus of the present invention are thoroughly described in the above-cited Massey reference.) In addition, the signals in certain other stages of the syndrome register are added (modulo-2) together and the resultant applied to the majority logic circuit. The unique apparatus of the present invention is characterized by the specification of the connections between selected stages of the syndrome register and the majority logic circuit and the connections between selected stages of the syndrome register itself. These connections are, in accordance with the present invention, specifiable by certain simple relationships. In particular, those stages of the syndrome register which are to be connected to the majority logic circuit are again defined by the nonzero terms of the generator polynomial. As in the check-generating circuit, the length of the syndrome register is determined by the total number of terms in the generator polynomial as above. Further, those stages of the syndrome register, the contents of which are to be combined (modulo-2) prior to application to the majority logic circuit, are determined from the following orthogonalization rules:

1. Signals from syndrome register stage No. (2$B$+$\alpha$ +$D_{r1}$+), $i$ = 1, 2 . . . $r$ are applied to an exclusive-OR circuit along with signals from stages Nos.

$$\sum_{j=1}^{i} (B + D_{ij} + V)$$

2. Signals from syndrome stage No. (3$B$+$\alpha$+$D_{r2}$+ 2$V$+1) are applied to a second exclusive-OR circuit along with signals from stages, Nos.

$$\sum_{i=0}^{r} (2B + D_{ri} + 2V + 1)$$

and

3. Signals from syndrome stages Nos. (3$B$+$\alpha$+$E_{t1}$+ $D_{r1}$+2$B$z1), $i$ = 1,2 . . . $r$ are applied to a third exclusive-OR circuit along with signals from stages, Nos.

$$\sum_{j=1}^{i} (B + E_{ij} + V) i = 1,2\ .\ .\ .\ s$$

where $D_{r0}$ is defined to be 0 and the remaining terms are determined as described in the discussion relating to the generator polynomial.

Again, an example is considered appropriate. For purposes of simplicity, the code for $t$=4, $B$=17 defined by the generator polynomial calculated above will be used. The orthogonalization rules for the example are, then, 1. Signals from syndrome register stages No. [2(17 )+15+5b!z3]=57
   and No.(17+5+3)=25 are applied to a first exclusive-OR circuit;
2. Signals from syndrome register stages No.[3(17 )+15+5b!z2(3)+1]=78 and
   No.[2(17)+0+2(3)+1]=41 and
   No.[2(17)+5+2(3)+1]=46 are applied to a second exclusive-OR circuit; and
3. Signals from syndrome register stages
   No.[3(17)+15+10+5+2(3)+1]=88 and
   No.(17+10+3) = 30 are applied to a third exclusive-OR circuit.

Figure 3:
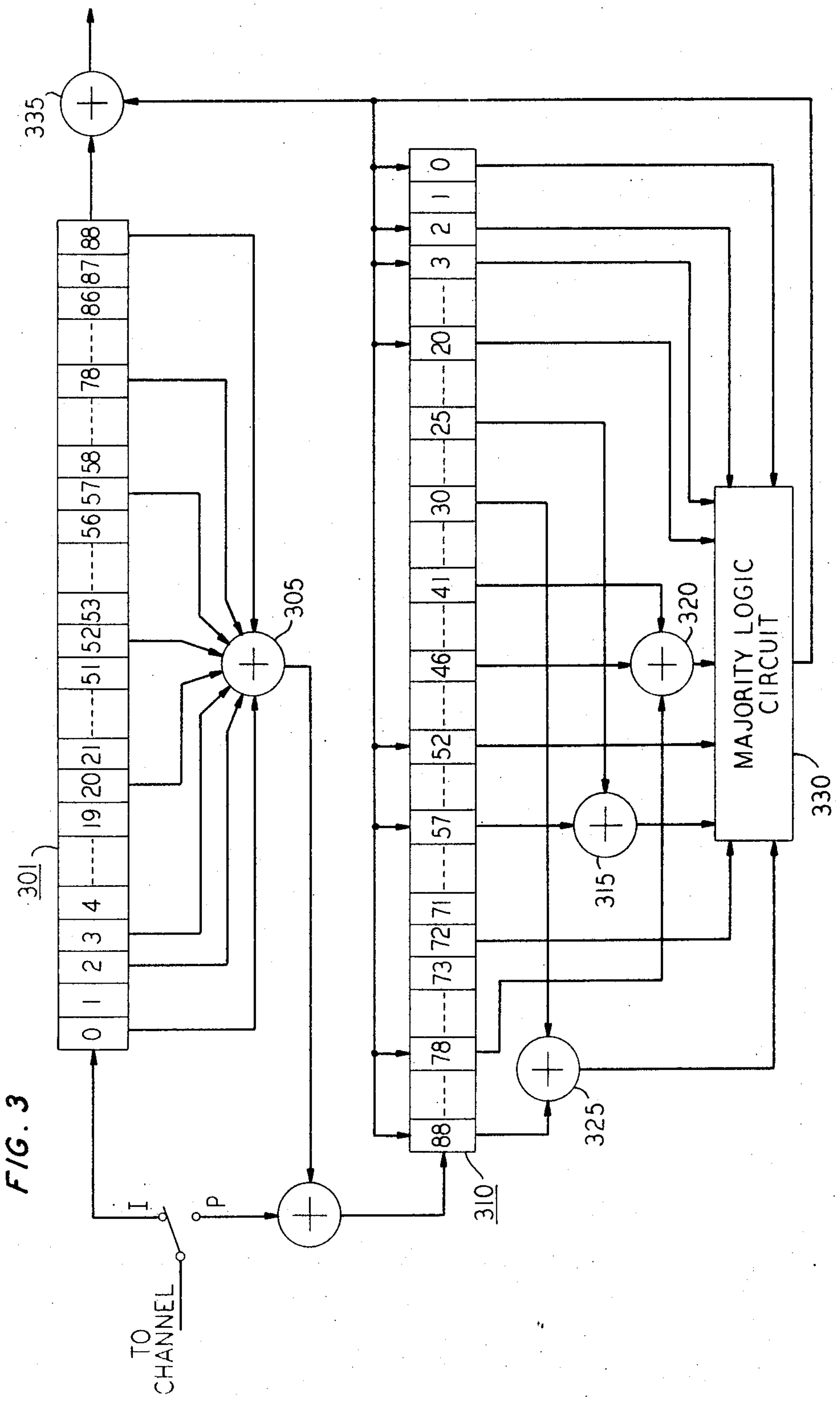
FIG. 3 shows the decoder for the same illustrative embodiment of FIG. 2.

FIG. 3 shows the decoder in accordance with one embodiment of the present invention for the illustrative example given above.

In particular shift register 301 is 88 stages long corresponding to the number of terms in the generator polynomial. Stages 0, 2, 3, 20, 52, 57, 78 and 88 are connected to exclusive-OR circuit 305. The check signals generated by exclusive-OR circuit 305 are applied to the exclusive-OR circuit 306 where it is combined with received check signals to form syndrome signals. These syndrome signals are applied to the leftmost stage of syndrome register 310. In accordance with the orthogonalization rules, syndrome stage No. 57 and syndrome stage No. 25 are connected to an exclusive-OR circuit (315 in FIG. 3). Similarly, signals in syndrome stage Nos. 78, 41 and 46 are combined (modulo-2) by exclusive-OR circuit 320 and signals in stage Nos. 88 and 30 are combined by exclusive-OR circuit 325. Majority logic circuit 330 responds to five or more 1's at its input terminals to produce a 1 at its output. The output from majority logic circuit 330 (be it 1 or 0) is exclusive-OR added with the outputs of those stages of syndrome register 310 corresponding to the nonzero terms of the generator polynomial as is well known in the prior art and explained, in particular, in the above-cited Massey text. The output from majority logic circuit 330 is, at the same time, applied to exclusive-OR circuit 335. As seen from FIG. 3, the information signals shifted through shift register 301 are also applied to exclusive-OR circuit 335. Errors in the information stream are thereby corrected as they are shifted out of register 301 to utilization circuitry in the receiver. The precise manner in which an erroneous bit is corrected will be discussed below.

Figure 4:
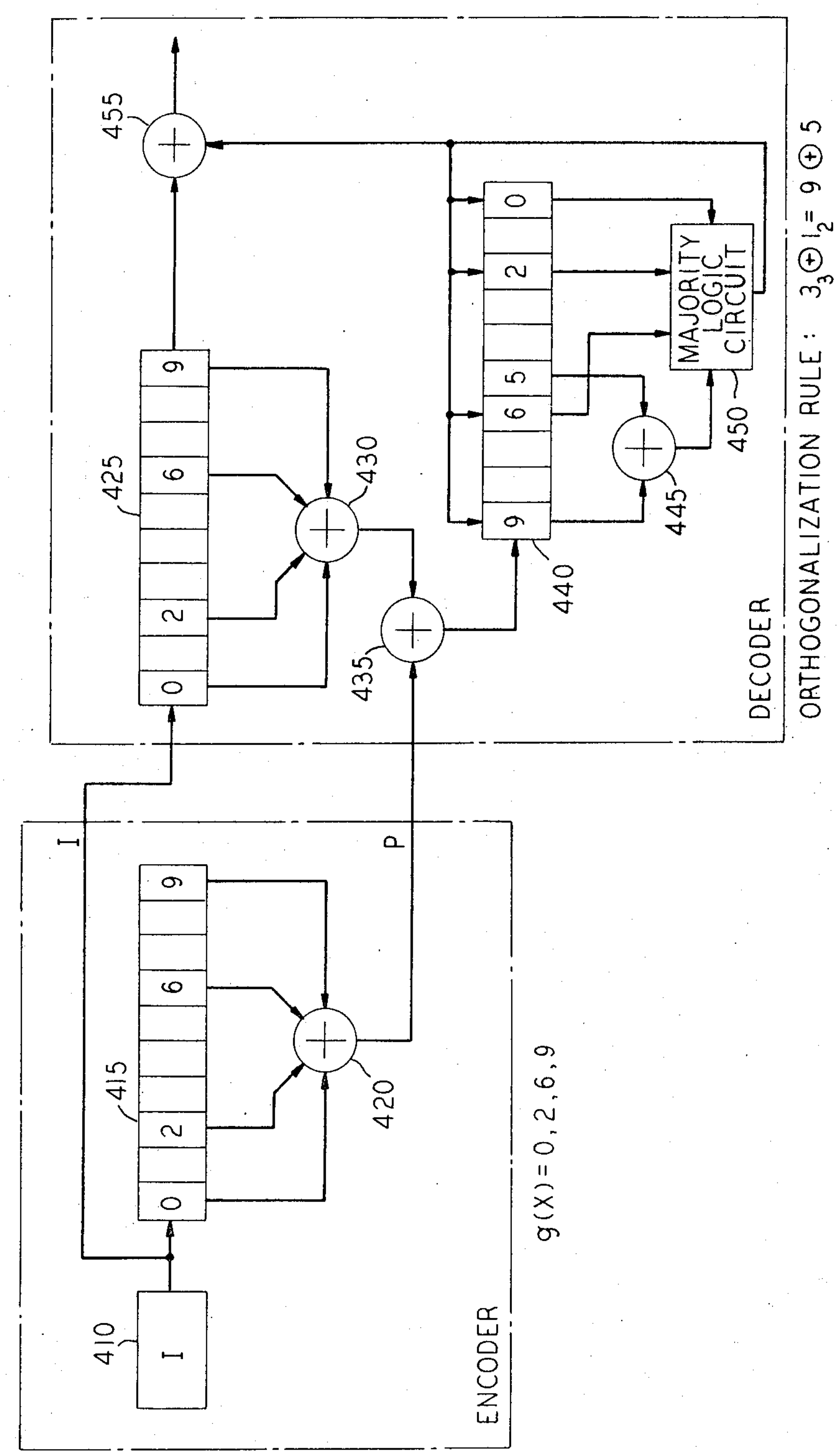
FIG. 4 shows an encoder and decoder for an alternate illustrative circuit in accordance with the principles of the present invention.

As seen from FIGS. 2 and 3, the shift registers are very long for the example chosen, however, the error-correcting code chosen (that is the code for correcting $t$=4, $B$=17) was the shortest nontrivial code available for illustration purposes. To more completely understand the operation of the apparatus of the preferred embodiment, a simpler encoder-decoder arrangement will be used. Specifically, an encoder-decoder for a code correcting $t$=2, $B$=2 errors is shown in FIG. 4. For information purposes, the generator polynomial and orthogonalization rules are shown on FIG. 4 also. Further, I represents the information stream generated at the transmitter, P the check signals generated by the encoder for that information stream, I* the information sequence and P* the check sequences received by the decoder, respectively.

In accordance with FIG. 4, the information stream generated at information source 410 is applied to shift register 415 selected stages of which are connected to exclusive-OR circuit 420 as determined by the nonzero terms of the generator polynomial. The output from the information source 410 and the check bits generated by exclusive-OR circuit 420 are applied to the channels. (For purposes of clarity, the single channel and switch have been replaced by separate channels for the information and parity bits, respectively.)

Analogously, the received data stream is applied to shift register 425 selected stages of which are connected to exclusive-OR circuit 430 again as determined by the nonzero terms of the generator polynomial. The check bits generated from the incorrect data stream are then applied to exclusive-OR circuit 435 where they are added (modulo-2) to the received check bits. The resulting syndrome signals are, in turn, applied to syndrome register 440. In accordance with the orthogonalization rules, stages 5 and 9 of syndrome register 440 are applied to exclusive-OR circuit 445 and the output from exclusive-OR circuit 445 applied to majority logic circuit 450. Additionally, the generator polynomial for the code specified determines the stages of syndrome register 440 to be connected to majority logic circuit 450. The feedback connections again, correspond to the nonzero terms of the generator polynomial.

Figure 5:
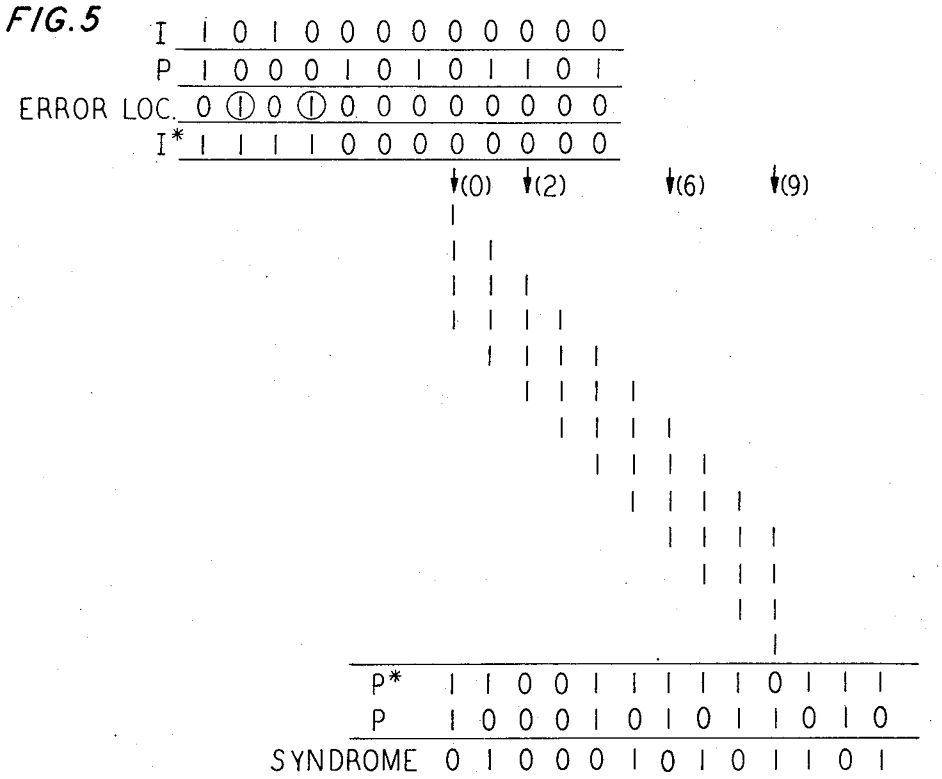
FIG. 5 illustrates the generation of syndrome signals in a typical circuit in accordance with the principles of the present invention.
Figure 6:
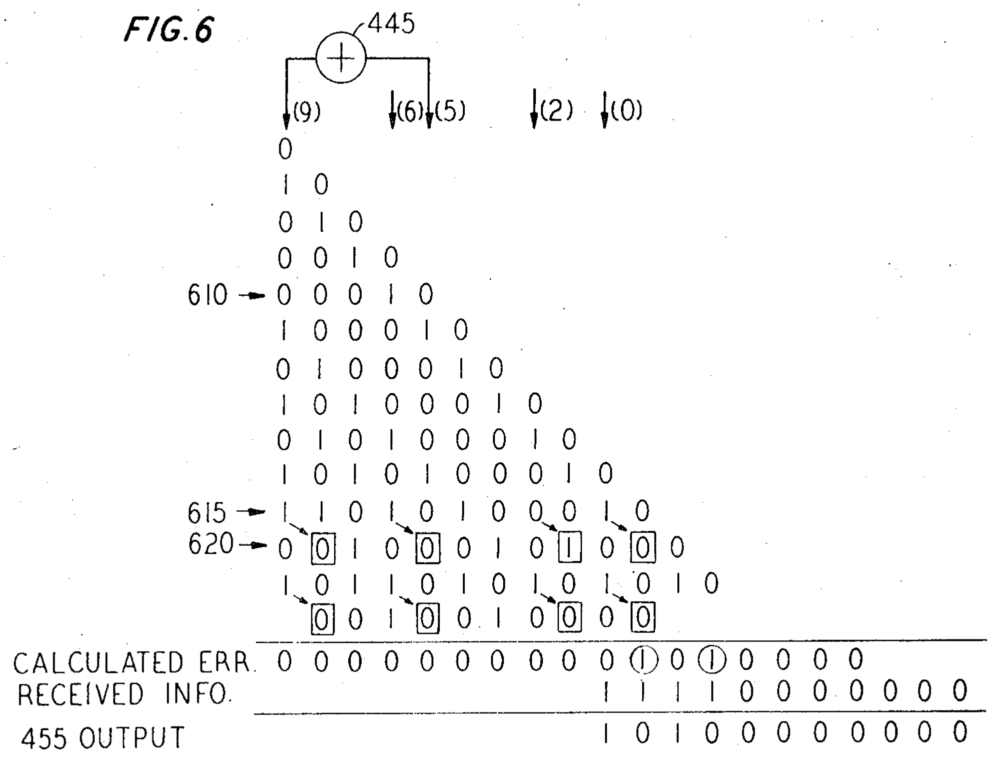
FIG. 6 illustrates the correction of errors in a code like that of FIG. 5.

FIG. 5 shows an arbitrary stream of information bits, I, generated at the transmitter, the corresponding check sequence, P, and the same information stream including two random errors (circled in FIG. 5), I*. FIG. 6 illustrates the calculation by the decoder of FIG. 4 of check bits P* from the incorrectly received information signals. FIG. 6 further shows the output from the majority logic circuit and the manner in which this output signal corrects the erroneous bits in the received data stream. Specifically, the leftmost column above the horizontal line in FIG. 6 depicts the progression of received information bits through the leftmost stage of syndrome shift register 440 of the decoder of FIG. 4. Similarly, the next column to the right shows the progression of bits through the next stage to the right of the syndrome shift register and so on for each of the columns and shift register stages. The arrows designating certain columns in FIG. 6, reference those stages which are connected directly to the majority logic circuit and the ⊕ sign, those which are applied to exclusive-OR circuit 445 prior to application to majority logic circuit 450. For example, row 610 shows the contents of the four leftmost stages of syndrome register 440 at the instant the fourth information bit is shifted into register 425. However, since it is clear from row 610, that there is less than a majority of 1's (a majority, in this case, being three out of four) applied to majority logic circuit 450, its output is 0 at this time. The situation is different, though, for row 615. As noted, the designated columns including the resulting exclusive-OR combination of the signals in the fourth and fifth columns from the left include three 1's. The resulting 1 generated by the majority logic circuit appears at the eleventh position from the left of the calculated error stream. Further, the feedback connections to syndrome register 440 invert the bits in the designated registers. Hence, in row 620, the bits enclosed within rectangles have been inverted.

Since the shift register 425 is nine stages long, it is apparent that the first information bit of the erroneously received information stream will be applied to exclusive-OR circuit 455 just as the tenth bit of the calculated error is generated by majority logic circuit 450 and applied thereto. The row labeled 455 output illustrates the output from exclusive-OR circuit 455 and is, as seen, a corrected version of the incorrectly received information stream.

Although the exemplary arrangement described above was specified in terms of the correction of random errors, it is obvious from the foregoing that the same procedure is used to derive circuitry wherein the burst error correction capability is specified initially.

FIGS. 7A and 7B include in tabular form a number of codes which have been specified in accordance with the preferred embodiment of the present invention as discussed above. In FIGS. 7A and 7B, $n_3$ and $N_A$ are words of art designating the error correcting capability and the size of the apparatus specified by the codes to which they apply. In addition, the $B_{min}$ entries in FIG. 7A and 7B indicate the minimum B required for such code to exist.

It is to be understood that the above-described arrangements are only illustrative of the application of the principles of the present invention. Numerous other arrangements may be devised by those skilled in the art without departing from the spirit and scope of the invention.

What is claimed is:

1. In a data communication system for correcting $t$-random errors and B-burst errors in accordance with a specified code, said system including a transmitter, a receiver, a channel interconnecting said transmitter and receiver, and a source of information signals at said transmitter, a check-signal generating circuit in said transmitter comprising a. an exclusive-OR adder, b. an encoder information shift register for storing signals from said source of information signals having as many stages as there are terms in the generator polynomial characterizing said code, each of said shift register stages being associated with a particular term of said generator polynomial, and c. means for connecting selected stages of said information shift register to said exclusive-OR circuit to derive check signals, said selected stages being specified by the terms of the noniterative formula $$g(x)=0, a_1, a_1+a_2, \ldots,$$

$$\sum_{i=1}^{t-2} a_i$$

$$B+V, 2B+\alpha+V, 2B+\alpha+V+D_{11}, \ldots,$$

$$2B+\alpha+V+D_{r1}, 3B+\alpha+D_{r1}+2V_{11},$$

$$3B+\alpha+D_{r1}+2V_{11}+E_{11}, \ldots,$$

$$3B+\alpha+D_{r1}+2V_{11}+E_{s1}$$

where $$V=\sum_{i=1}^{t-2} a_i$$

$$D_{ij}=(\bar{V}+2)\sum_{\sigma=j}^{i} f\sigma j\leq i$$

$$E_{ij}=(\bar{V}+2)\sum_{\sigma=j}^{i} k\sigma j\leq i$$

$$\alpha=(\bar{V}+2)\left(1+\sum_{\sigma=1}^{s} k\sigma\right)$$

and where $$(a_1, a_2, a_3 \ldots a_{t-2})$$

is a difference set and $$(f_1, f_2, f_3 \ldots f_r)\ (k_1, k_2, k_3 \ldots k_s)$$

is a composite difference set for which $r+s=t-2$ and $$\sum_{i=1}^{s} k_i > \sum_{j=1}^{r} f_j$$

each integer term of said formula designating a like-numbered stage of said register and wherein said register stages are numbered consecutively starting at zero.

2. Apparatus as in claim 1 further comprising a check-signal generating circuit at said receiver including a. a decoder information shift register having as many stages as said encoder information shift register, b. a decoder exclusive-OR adder, c. means for connecting selected stages of said decoder shift register to said decoder exclusive-OR adder, said decoder shift register stages corresponding to said selected stages of said encoder information register to derive locally generated check signals, d. means for applying information signals received from said channel to said decoder information shift register, and e. logic means for logically combining check signals received from said channel with signals generated by said decoder exclusive-OR adder whereby syndrome signals of a first logic level are generated by said logic means when said received and locally generated check signals are the same and whereby syndrome signals of a second logic level are generated when said received and locally generated check signals are different.

3. Apparatus as in claim 2 wherein said receiver further includes a syndrome shift register for storing said syndrome signals generated by said logic means and wherein said syndrome register includes as many stages as said encoder information shift register.

4. Apparatus as in claim 3 wherein said receiver further includes a majority logic circuit responsive to signals from said syndrome shift register.

5. Apparatus as in claim 4 further including means for connecting designated stages of said syndrome register to said majority logic circuit and wherein said designated stages include stages corresponding to said selected stages of said encoder and decoder information shift registers.

6. Apparatus as in claim 5 wherein said means for connecting further includes at least one exclusive-OR adder.

7. Apparatus as in claim 5 further including feedback means responsive to signals from said majority logic circuit for inverting signals stored in said selected stages of said syndrome register.

8. Apparatus as in claim 7 further including means responsive to signals from said majority logic circuit for correcting incorrectly received signals stored in said decoder information shift register.

9. Apparatus as in claim 8 wherein said means for correcting includes an exclusive-OR adder for inverting selected signals at the output of said decoder information shift register in response to said signals from said majority logic circuit.

10. Apparatus as in claim 9 wherein said means for connecting said designated stages of said syndrome register to said majority logic circuit includes a number of exclusive-OR circuits the input signals of which are determined in accordance with the following rules:

a. Signals from syndrome register stage numbered $(2B+\alpha\alpha+D_{ri}+V)$, $i=1, 2 \ldots r$ are applied to a first connecting exclusive-OR circuit along with signals from stages numbered $$\sum_{j=1}^{i} (B+D_{ij}+V)$$

b. Signals from syndrome stage numbered $(3B+\alpha+D_{r2}+V+1)$ are applied to a second connecting exclusive-OR circuit along with signals from stages numbered $$\sum_{i=0}^{r} (2B+D_{ri}+2V+1), \text{ and}$$

c. Signals from syndrome stages, numbered $(3B+\alpha+E_{i1}D_{+}$⅞B$V+1)$, $i=1,2 \ldots r$ are applied to a third exclusive-OR circuit along with signals from stages numbered $$\sum_{j=1}^{i} (B+E_{ij}+V) i=1, 2 \ \ldots \ s$$

where $D_{r0}$ is defined to be 0, wherein the number designation of each of said syndrome register stages is the nonzero term of said generator polynomial to which said syndrome stage corresponds.

11. A method for detecting and correcting errors in accordance with a specified code in a data stream processed by a data transmission system including a transmitter, a receiver and a noisy interconnecting channel comprising the steps of a. generating at said transmitter a first set of check signals from said data stream by logically combining selected ones of said data signals, said selected ones of said data stream signals being specified by the nonzero terms of the generator polynomial for said code determined as follows:

$$0, a_1, a_1+a_2, \ldots,$$

$$\sum_{i=1}^{t-2} a_i$$

$$B+V, 2B+\alpha+V, 2B+\alpha+V+D_{11}, \ldots,$$

$$2B+\alpha+V+D_{r1}, 3B+\alpha+D_{r1}+[2V11]\,2V_{11},$$

$$3B+\alpha+D_{r1}+[2V11]\,2V_{11}+E_{11}, \ldots,$$

$$3B+\alpha+D_{r1}+[2V11]\,2V_{11}+E_{s1}$$

where $$V=\sum_{i=1}^{t-2} a_i$$

$$D_{ij}=(\overline{V}+2)\sum_{\sigma=j}^{i} f\sigma j \leq i$$

$$E_{ij}=(\overline{V}+2)\sum_{\sigma-j}^{i} k\sigma j \leq i$$

$$\alpha=(\overline{V}+2)\left(1+\sum_{\sigma=1}^{s} k\sigma\right)$$

and where $$(a_1, a_2, a_3 \ldots a_{t-2})$$

is a difference set and $(f_1, f_2, f_3 \ldots f_r)$ $(k_1, k_2, k_3 \ldots k_s)$ is a composite difference set for which $r+s=t-2$ and $$\sum_{i=1}^{s} k_i > \sum_{j=1}^{r} [f_i] f_i$$

b. transmitting said data stream and check signals to said receiver by means of said channel, c. generating a second set of check signals from said received data signals by logically combining those of said data signals corresponding to said nonzero terms of said generator polynomial, d. comparing at said receiver each check signal in said first set of check signals with the check signal in said second set of check signals generated from the corresponding ones of said data signals as said first set check signal, e. generating a first syndrome signal when said compared check signals match and generating a second syndrome signal when said compared check signals do not match, f. selectively logically combining selected ones of said syndrome signals, g. applying signals produced when said selected syndrome signals are logically combined and applying other selected syndrome signals to majority logic circuitry, and h. inverting certain ones of said received data signals in response to signals produced by said majority logic circuitry.

12. A method for correcting $t$-random errors and B-burst errors in a stream of data signals processed by a data transmission system having a transmitter, a receiver and an interconnecting channel, a. specifying the nonzero terms of the generator polynomial as follows:

$$0, a_1, a_1+a_2, \ldots,$$

$$\sum_{i=1}^{t-2} a_i$$

$$B+V, 2B+\alpha+V, 2B+\alpha+V+D_{11}, \ldots,$$

$$2B+\alpha+V+D_{r1}, 3B+\alpha+D_{r1}+[2V11]\,2V_{11},$$

$$3B+\alpha+D_{r1}+[2V11]\,2V_{11}+E_{11}, \ldots,$$

$$3B+\alpha+D_{r1}+[2V11]\,2V_{11}+E_{s1}$$

where $$V=\sum_{i=1}^{t-2} a_i$$

$$D_{ij}=(\overline{V}+2)\sum_{\sigma=j}^{i} f\sigma j \leq i$$

$$E_{ij}=(\overline{V}+2)\sum_{\sigma=j}^{i} k\sigma j \leq i$$

$$\alpha=(\overline{V}+2)\left(1+\sum_{\sigma=1}^{s} k\sigma\right)$$

and where $$(a_1, a_2, a_3 \ldots a_{t-2})$$

is a difference set and $(f_1 f_2 f_3 \ldots f_r)$ $(k_1, k_2, k_3 \ldots k_s)$ is a composite difference set for which $r+s=t-2$ and $$\sum_{i=1}^{s} k_i > \sum_{j=1}^{r} [f_i] f_j$$

each integer term of said formula designating a like-numbered stage of said register and wherein said register stages are numbered consecutively starting at zero, b. storing, in order of receipt, as many of said data signals as the largest value of said nonzero terms of said generator polynomial whereby each of said stored data signals corresponds to a term, nonzero or otherwise, of said generator polynomial, c. combining, in accordance with the rules of modulo-2 addition, those selected stored data signals which correspond to the nonzero terms of said generator polynomial, d. transmitting said data signals, and the check signals resulting from the step of combining said selected data signals, to said receiver, e. storing at said receiver as many of said received data signals as there are terms of said generator polynomial, each of said stored received data signals bearing an ordered relationship to a term, nonzero or otherwise, of said generator polynomial, f. combining, in accordance with the rules of modulo-2 addition, those selected stored received data signals corresponding to the nonzero terms of said generator polynomial, thereby producing a set of locally generated check signals, g. comparing said check signals received from said transmitter and said locally generated check signals to derive a set of syndrome signals, h. storing as many of said syndrome signals as there are terms of said generator polynomial, each of said stored syndrome signals corresponding to a term, nonzero or otherwise, of said generator polynomial, said stored syndrome signals being designated by a sequence of consecutive integers, the first of which is zero, i. selectively combining different ones of said stored syndrome signals in accordance with the following rules:

a. Syndrome signal in syndrome register stage numbered $(2B+\alpha+D_{r1}+V)$, $i=1, 2 \ldots r$ is combined with syndrome signals in syndrome register stages numbered $$\sum_{j=1}^{i} (B+D_{ij}+V)$$

b. Syndrome signal in syndrome register stage numbered $(3B+\alpha+D_{r2}+2V+1)$ is combined with syndrome signals from register stage numbered $$\sum_{i=0}^{r} (2B+D_{ri}+2V+1)$$

and c. Syndrome signals in stages numbered $(3B+\alpha+E_{i1}+_{r1}+BV+1)$, $i=1, 2 \ldots r$ are combined with syndrome signals in stages numbered $$\sum_{j=1}^{i} (B+E_{ij}+V) i=1, 2 \ldots s$$

where $D_{r0}$ is defined to be 0 and where $$V=\sum_{i=1}^{t-2} a_i$$

$$D_{ij}=(\bar{V}+2)\sum_{\sigma=j}^{i} f\sigma j \leq i$$

$$E_{ij}=(\bar{V}+2)\sum_{\sigma=i}^{i} k\sigma j \leq i$$

$$\alpha=(\bar{V}+2)\left(1+\sum_{\sigma=1}^{s} k\sigma\right)$$

and where $$(a_1, a_2, a_3 \ldots a_{t-2})$$

is a difference set and $$(f_1, f_2, f_3 \ldots f_r)\ (k_1, k_2, k_3 \ldots k_s)$$

is a composite difference set for which $r+s=t-2$ and $$\sum_{i=1}^{s} k_i > \sum_{j=1}^{r} f_j$$

and where said numbers are said integer designations of said stored syndrome signals.

* * * * *